United States Patent Office 3,271,359
Patented Sept. 6, 1966

3,271,359
EQUILIBRATION OF ORGANOPOLYSILOXANES USING PHOSPHORUS-CONTAINING CATALYSTS
Ben A. Bluestein, Schenectady, N.Y., assignor to General Electric Company, a corporation of New York
No Drawing. Filed Dec. 24, 1962, Ser. No. 246,667
7 Claims. (Cl. 260—46.5)

The present invention relates to an improved method for making a variety of organopolysiloxane polymers and copolymers and to products derived therefrom. More particularly, the present invention relates to the employment of certain phosphorous-containing catalysts for equilibrating organopolysiloxane hydrolyzates to provide for the production of a variety of organopolysiloxane polymers, copolymers, and novel organopolysiloxane elastomeric compositions.

Various methods are known for making organopolysiloxane polymers such as fluids and gums, involving the intercondensation of organosiloxy units. For example, one method of forming organopolysiloxanes is by intercondensing, with various catalysts such as ferric chloride, organosiloxy units resulting from the hydrolysis or cohydrolysis of diorganodihalosilanes or mixtures thereof. Although the use of such intercondensation catalysts provides for the production of valuable organopolysiloxane products, as it is generally known, such intercondensation of organosiloxy units does not provide for the advantageous results achieved by true catalytic equilibration. Unlike intercondensation, catalytic equilibration, which provides for both rearrangement and intercondensation of siloxy units during the formation of the polymer, can be employed for making organopolysiloxane polymers from low molecular weight cyclopolydiorganosiloxanes, or mixtures of such cyclics with various organopolysiloxane hydrolyzates, including chain-stopping units such as hexamethyldisiloxane. The advantages achieved by employing low molecular weight cyclopolydiorganosiloxanes in the production of organopolysiloxane gums and fluids are significant because these cyclics can be produced readily and can be purified by distillation.

Although many advantages can be achieved by the method of catalytic equilibration as taught on page 80 of Rochow, Chemistry of the Silicones, second edition, John Wiley & Sons, 1951, few readily available chemicals can be employed as equilibration catalysts. Except for such chemicals as potassium hydroxide and sulphuric acid, for example, few materials can be used to satisfactorily equilibrate low molecular weight cyclic polysiloxanes, or organopolysiloxane mixtures containing such cyclics or chain-stopping units with various organopolysiloxane hydrolyzates. Potassium hydroxide, moreover is unsuitable for equilibrating low molecular weight cyclopolysiloxanes, such as octamethylcyclotetrasiloxane or chain-stopping units, with organopolysiloxane materials containing carboxyalkyl radicals to provide for the production of copolymers having chemically combined diorganosiloxy units which include siloxy units having carboxyalkyl radicals attached to silicon. In addition, even though the use of potassium hydroxide or sulphuric acid can provide for the production of a wide variety of valuable fluids and gums from low molecular weight cyclopolysiloxanes, these catalysts have to be completely removed from the polymers before they are put into service. Substantial depolymerization of the polymer can result, for example, even if only trace amounts of these equilibration catalysts are retained by the polymer when it is exposed to elevated temperatures. Although a variety of methods are available for decatalyzing organopolysiloxane polymers, such as extensive washing and neutralization procedures, and methods utilizing various chemicals such as taught in Boot Patent 3,057,821, Grubb Patent 2,789,109, etc., assigned to the same assignee as the present invention, all of these methods require considerable time and expense. The over-all manufacturing of organopolysiloxane polymers employing sulphuric acid or potassium hydroxide as catalysts accordingly, are rendered economically less attractive.

The present invention is based on the discovery that certain catalysts, formed by the reaction between particular phosphorus halogen compounds, such as phosphorous-oxychloride, and water, can be employed to convert low molecular cyclic polysiloxanes and mixtures thereof, to a variety of organopolysiloxane products such as fluids and gums, including copolymers containing chemically combined siloxy units, having carboxyalkyl radicals, attached to silicon by carbon-silicon linkages. This result is quite surprising since other phosphorous halogen catalysts of the type shown in Sprung Patent 2,472,629, for example, phenoxy phosphoryl dichloride or phenyl phosphonyl dichloride have been found to be ineffective for equilibrating such low molecular weight cyclic polysiloxanes. In addition, the organopolysiloxane polymers produced in accordance with the present invention can be put directly into high temperature service without any need for removing the catalyst from the polymer by additional chemical treatment.

In accordance with the present invention there is provided a process for making a polymer having the formula, (1) 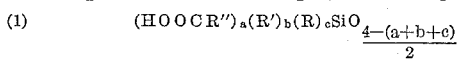

which process comprises heating to a temperature between 20° C. to 170° C., a mixture comprised of an organopolysiloxane, and .01% to 10% by weight thereof of an equilibration catalyst, where said organopolysiloxane is selected from (a) An organosiloxane hydrolyzate consisting of components having chemically combined structural units included by the formula, (2) 

(b) A carboxyalkyl hydrolyzate consisting of components having chemically combined structural units included by the formula, (3) 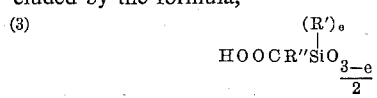

and (c), a mixture of said organosiloxane hydrolyzate and said carboxylalkyl hydrolyzate, and where said equilibration catalyst is the product of reaction at a temperature in the range of from —10° C. to 100° C., of from 0.1, to less than about 3 moles of water, per mole of a phosphorous halogen compound, selected from the class consisting of phosphorous pentahalides and phosphorous oxygen halides, $a$ is equal to from 0 to 1, inclusive, $b$ is equal to from 0 to 2, inclusive, $c$ is equal to from 0 to 3, inclusive, and the sum of $a$, $b$ and $c$ is equal to from 1.5 to 3, inclusive, $d$ is an integer equal to from 1 to 3, inclusive, $e$ is an integer equal to from 1 to 2, inclusive, R is a member selected from monovalent hydrocarbon radicals, halogenated monovalent hydrocarbon radicals, and cyanoalkyl radicals, R′ is a member selected from monovalent hydrocarbon radicals and halogenated monovalent hydrocarbon radicals, and R″ is an alkylene radical.

Radicals included by R of Formula 1 are aryl radicals, and halogenated aryl radicals such as phenyl, chlorophenyl, xylyl, tolyl, etc.; aralkyl radicals such as phenylethyl benzyl, etc.; aliphatic, haloaliphatic and cycloaliphatic radicals, such as alkyl, alkenyl, cycloalkyl, haloalkyl, including methyl, ethyl, propyl, chlorobutyl, cyclohexyl, etc.; cyanoalkyl radicals such as cyanoethyl, cyanopropyl, cyanobutyl, etc. Radicals included by R' of Formula 1 are all of the radicals included by R above except cyanoalkyl radicals, and radicals included by R" are alkylene radicals such as ethylene, trimethylene, tetramethylene, octamethylene, etc. R, R', and R" can be all the same radical respectively, or any two or more of the aforementioned R, R' and R" radicals; R and R' are preferably methyl, and R" is preferably ethylene.

The phosphorous halogen compounds utilized in the practice of the invention to form the equilibration catalyst are phosphorous pentahalides such as phosphorous pentachloride and phosphorous pentabromide and phosphorous oxygen halides such as phosphorous oxytrichloride and phosphorous oxytribromide.

It is not completely understood why the equilibration catalyst of the present invention can be employed for equilibrating cyclopolydiorganosiloxanes and mixtures thereof, while other phosphorous halogen compounds, such as shown in Sprung Patent 2,472,629 are not effective. One theory that has been advanced, which is supported both by experimental evidence, and the work of J. R. Van Wazer et al. J.A.C.S. 81, 6360 (1959), is that the catalyst of the present invention, unlike the catalyst of the aforementioned Sprung patent is a phosphorous halo acid of the formula, (4) 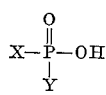

or a mixture of phosphorous halo acids having the formulae, (5) 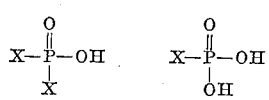

where X is a halogen radical selected from chloro and bromo, and Y is a member selected from X and hydroxy. It is assumed that the phosphorous halo acid of either Formula 4 or Formula 5, which includes dichloro-ortho-phosphoric acid, dibromo-ortho-phosphoric acid, a mixture of dichloro-ortho-phosphoric acid and chloro-ortho-phosphoric acid, and a mixture of dibromo-ortho-phosphoric and bromo-ortho-phosphoric acid, is the catalyst; it can be employed in the equilibration mixture at 0.01%, to 10%, and preferably 0.1 to 1% by weight, based on the weight of the organopolysiloxane. It is to be clearly understood however, that this assumption is in no way intended to limit the scope of the invention as previously defined.

The polymers of Formula 1 include a variety of products such as fluids and gums having viscosities ranging from 10 centipoises or less, to as high as $10^8$ centipoises or more. For example, fluids can vary between about 1 to about $10^5$ centipoises at 25° C., while gums can vary between $10^5$ to $10^8$ or higher. These materials can be employed in conventional applications in which organopolysiloxanes are utilized and possess all of the outstanding advantages generally attributed to organopolysiloxane polymers. For example, the gums made in accordance with the present invention can be employed to make elastomers having superior resistance to heat-age. The fluids can be utilized in lubricating and hydraulic applications and possess valuable high temperature properties.

Some of the polymers can be made by the equilibration of the organosiloxane hydrolyzate shown in Formula 2 which can be composed of up to 100 percent by weight of a cyclopolydiorganosiloxane having the formula, (6) 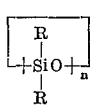

where R is as defined above and $n$ is an integer equal to from 3 to 10, inclusive. The organosiloxane hydrolyzate of Formula 2 can be obtained by hydrolyzing chlorosilanes included by the formula, (7) $(R)_d Si(X)_{4-d}$ where R, $d$ and X are as defined above. In addition, copolymers of units shown by Formulae 2 and 3 can be made by equilibrating mixture of the cyclics of Formula 6 with or without hydrolyzates composed of units of Formula 2, and with hydrolyzates composed of carboxyalkylsiloxy units of Formula 3 to provide for the production of carboxaylkyl polymers and copolymers, where $a$ in Formula 1 is equal to .001 to 1, inclusive, $b$ is equal to from 0 to 2, inclusive, $c$ is equal to from 0 to 2.5, inclusive, and the sum of $a$, $b$ and $c$ is equal to from 1.5 to 3, inclusive.

Hydrolyzates having units shown by Formula 3 can be formed by the method of Bluestein, Patent 2,900,363, involving the hydrolysis in hydrochloric acid of the cyanoalkyl chlorosilane, included by Formula 7 and more particularly by the following formula, (8) 

where R, R", $e$ and X are as defined above.

The polymers of Formula 1 also include fluids and gums that are made by the equilibration of hydrolyzate of units of Formula 2 or Formula 3, or mixtures thereof, free of the cyclics of Formula 6 but which contain hydrolyzate of the formula, (9) 

where R''' can be R or R', or a mixture thereof and Z can be HOOCR", R, or R'.

The equilibration catalyst utilized in the practice of the invention is preferably utilized at from 0.1 to 1 percent by weight of the organopolysiloxane. It can be made in the form of a "premix" by a batch procedure by forming a mixture of water and a phosphorous halogen compound, as previously defined, and effecting reaction between the respective components. In particular situations, it has been found expedient to add the water to the phosphorous halogen compound, although the order of addition of either component used in forming the "premix" is not critical. In particular instances, for example, when the equilibration of organopolysiloxane can be achieved advantageously in the absence of organic solvent, the equilibration catalyst can be formed by the "in situ" method. The phosphorous halogen compound and water can be added separately as desired to the organopolysiloxane.

If the equilibration catalyst is formed at temperatures in which the components react exothermically upon contact, such as at room temperatures (a temperature of about 25° C.), small increments of water, such as drops, can be added to the phosphorous halogen compound at a desirable rate. Another procedure that can be employed is to mix the phosphorous halogen compound and ice at temperatures below 0° C. and allow the components to warm gradually to effect reaction.

After the components of the equilibration catalyst have reacted, a preferred procedure, where the "premix" is formed is to heat the catalyst to a temperature between 25° C. to 80° C., for periods of 0.1 to 48 hours. However, desirable results can be obtained if the catalyst is utilized directly without any post-heating period, or preferably allowing it to stand at room temperature for a period of at least 24 hours before being used, if external heating is not employed.

After the catalyst has been formed, it can be stored for an extended period of time such as 1 to 2 weeks at a temperature of below 0° C. to 25° C.

In accordance with the practice of the present invention, a mixture is formed of the equilibration catalyst and organopolysiloxane which can be in the form of a cyclic polydiorganosiloxane as shown in Formula 6, or a mixture thereof, with an organopolysiloxane hydrolyzate containing chemically combined units of either Formula 2 or Formula 3 or a mixture of hydrolyzate of Formula 2 and Formula 3 free of cyclics. The equilibration of organopolysiloxane is then effected to provide for the formation of various organopolysiloxane polymers or copolymers.

The equilibration of the organopolysiloxane can be accomplished in accordance with conventional equilibration procedures, including the employment of an organic solvent to facilitate the equilibration of organopolysiloxane. When an organic solvent is utilized to facilitate the equilibration of organopolysiloxane, the equilibration catalyst is added to the organopolysiloxane in the form of a premix either separately or with the organic solvent and the resulting mixture can be equilibrated at temperatures between 25° C. to 150° C. Suitable organic solvents that can be employed are any inert organic solvents which do not interfere with the equilibration of the organopolysiloxane. Suitable organic solvents include hydrocarbon solvents such as benzene, toluene, xylene, etc., and others such as acetonitrile, acetone, etc.

Reaction times will vary in accordance with the organopolysiloxanes used, the temperature utilized and the amount of catalyst employed. A period of as little as one hour or less, to as long as 24 hours or more will not be unusual. The final equilibrated product can then be stripped of solvent, volatile materials, etc. and utilized thereafter for the production of a variety of organopolysiloxane products.

Depending upon the organopolysiloxane equilibrated, the nature of the polymer or copolymer can vary widely. For example, gums produced by equilibrating units shown in Formula 2 where the ratio of the R radicals as defined therein, to silicon atoms is 1.95 to 2.01, can be utilized in the production of novel compositions convertible to the elastomeric state. These elastomers can be made by milling the gum with various fillers for example, silica fillers, such as precipitated silicas, fumed silica, including such filler treated by the method of Lucas Patent 2,938,009, assigned to the same assignee as the present invention, and other reinforcing and extending or semireinforcing filler such as titanium oxide, lithopone, calcium carbonate, diatomaceous earth, etc., as shown in Simpson Patent 3,017,378 also assigned to the same assignee as the present invention. A proportion of 10 to 300 parts of filler can be utilized. Additives for structure control such as diphenylsilanediol, silanol-stopped polydimethylsiloxanes, alkoxy-stopped polydimethylsiloxanes, etc. can also be utilized. Unlike conventional organopolysiloxane gums, the gums made from units of Formula 2 in accordance with the invention can be cured at temperatures between 80° C. to 300° C. by employing mixtures of polyols and metal oxides. Polyols that can be employed are aliphatic dihydric and trihydric alcohols ssuch as ethylene glycol, glycerol in proportion of from 1 to 10 parts per 100 of gum; metal oxides that can be employed are for example, ferric oxide, cupric oxide, etc., and mixtures thereof which can be utilized at from 0.5 to 40 parts per 100 of gum. Heat-age additives, such as aryl urethanes, cerium naphthenate, etc. can also be employed. The cure of the gum, or gum filled mixture can be assisted by use of from about 0.1 to more than 8 parts per 100 parts of gum of conventional peroxide curing catalyst such as benzoyl peroxide, bis-(2,4-dichlorobenzoyl) peroxide, etc. and others as disclosed in the aforementioned Simpson patent at temperatures between 80° C. to 300° C. Peroxide cures can also be achieved in the absence of the polyol and metal oxide.

Copolymers of chemically combined units of Formulae 2 and 4 can also be made by the practice of the invention in the form of fluids and gums. Gums included by Formula 1, where $a$ is equal to from .001 to 0.1 and the sum of $a$, $b$ and $c$ is equal to 1.9 to 2.01, having a viscosity of at least 100,000 centipoises at 25° C. and carboxyalkyl radicals attached to silicon can be cured with the previously described peroxide catalysts, and mixtures thereof with polyvalent metal compounds, such as metal oxides, for example, zinc oxide, calcium oxide, etc. or a mixture thereof. Other polyvalent metal compounds and fillers that can be employed are disclosed in Patent 3,047,528, Bluestein. For example, polyvalent metal compounds that are operable include oxides, hydroxides, carbonates, carboxylic acids, salts of carboxylic acids containing up to 11 carbon atoms of zinc, magnesium, calcium, strontium, barium, titanium, cobalt, iron, nickel, and other metals of groups Ib, IIa, IIb, etc. Generally the products produced in accordance with the present invention can be utilized in the various applications in which conventional organopolysiloxane products have been employed.

In order that those skilled in the art will be better able to practice the present invention, the following examples are given by way of illustration and not by way of limitation. All parts are by weight.

EXAMPLE 1

The equilibration catalyst utilized in the practice of the invention was prepared by adding at room temperature, various amounts of water in the form of small increments to phosphorous-oxychloride. The proportions of water utilized provided for the production of reaction products resulting frm mixtures composed of from 0.5, 1 and 2 moles of phosphorous-oxychloride per mole of water. The aforementioned reaction products were post-heated at a temperature between 55° C. to 60° C. for varying periods of time.

The respective products were analyzed for equivalent [Cl−] per gram of product by titration with a standard silver nitrate solution and equivalent [H+] produced per gram of product by using a Beckman, pH meter and titrating with a standard sodium hydroxide solution. The results obtained are shown in Table I below together with the ratio of chlorine to phosphorous in the product as calculated from these results:

Table I

| $POCl_3/H_2O$, Mole Ratio | [Cl−] | [H+] | Cl/P |
|---|---|---|---|
| 0.5 | 0.0063 | 0.0181 | 0.6 |
| 1 | 0.0126 | 0.0250 | 1.1 |
| 2 | 0.0168 | 0.0238 | 2.4 |

In addition, infrared established the presence of P—OH and P=O in the respective mixtures.

The above-prepared equilibration catalysts were evaluated for effectiveness for equilibrating at temperatures between 50° C. to 110° C. organopolysiloxane mixtures composed of octamethylcyclotetrasiloxane and 1% by weight thereof, of a carboxyethylmethyl hydrolyzate. The catalyst was utilized at a concentration of 1% by weight, based on the weight of the equilibration mixture. The carboxyethyl hydrolyzate mixture employed in the equilibration mixture, was made by hydrolyzing a proportion of 1 part of methylcyanoethyldicholorosilane per 3 parts of concentrated hydrochloric acid and refluxing the hydrolsis mixture for about 70 hours. The hydrolyzate was separated from the acid layer and washed with a saturated solution of sodium chloride in water.

In Table II below there is shown an evaluation of the equilibration catalyst of the present invention, based upon the results obtained with the above-described reaction product of "Bluestein," of phosphorous-oxychloride and water which were post-heated as compared to 1% by weight of phosphorous-oxychloride and phenoxyphosphoryl chloride as utilized by Sprung, Patent 2,472,629. Under "Equilibration," gum signifies that the equilibration mixture changed from a cloudy plural phase mixture of cyclic and hydrolyzate to a clear copolymer in 24 hours or less. If no equilibration took place at all, the mixture remained unchanged over a period of about 24 hours, which is indicated in the table by the term "None."

*Table II*

| Catalyst | Catalyst Preparation | | | Equilibration at 50° C.–110° C. |
|---|---|---|---|---|
| | $POCl_3:H_2O$, Mole Ratio | Post-Heated | | |
| | | Time (Hr.) | Temp. (° C.) | |
| Bluestein | 0.5 | 1 | 55 | Gum. |
| Do | 1.0 | ½ | 55 | Gum. |
| Do | 1.0 | 4 | 55 | Gum. |
| Do | 2.0 | 2½ | 60 | Gum. |
| $POCl_3$ | | | | None. |
| $C_6H_5O$-$POCl_2$ | | | | Do. |

EXAMPLE 2

A copolymer composed of 1.8 weight percent of chemically combined carboxyethylmethylsiloxy units and 98.2 weight per cent of dimethylsiloxy units was made by equilibrating a mixture of 600 parts of octamethylcyclotetrasiloxane and 10.8 parts of the carboxyethylmethyl hydrolyzate of Example 1 with 6 parts of equilibration catalyst. The catalyst was made by forming a mixture in accordance with the procedure of Example 1, composed of phosphorous-oxychloride and water at a mole ratio of 2 moles of phosphorous-oxychloride per mole of water, and heating the resulting product for 22 hours at a temperature between 60 to 65° C. A mixture of 200 parts of the octamethylcyclotetrasiloxane, the hydrolyzate and the catalyst was initially heated until the equilibration was started as evidenced by an increase in viscosity. After the mixture had been heated for about 2½ hours at about 80° C., 400 more parts of the octamethylcyclotetrasiloxane were added to the mixture and it was heated continually for an additional 15 hours at temperatures up to 168° C. The resulting product was a copolymer having a viscosity of about $5 \times 10^5$ centipoises at 25° C.

EXAMPLE 3

An organopolysiloxane composition convertible to the cured, solid, elastic state was made by milling the copolymer of Example 2, with various materials such as a filler and a curing catalyst. No attempt was made to remove from the polymer any equilibration catalyst residues such as by washing or decatalyzing procedures. The copolymer was milled with fume silica in a proportion of 40 parts of filler to 100 parts of copolymer. To portions of the resulting filler-gum blend was added respectively varying amounts of zinc oxide, as a curing catalyst, ranging from 0.2 part to 0.9 part per 100 parts of gum. In particular cases benzoyl peroxide $(BzO)_2$ was used as a curing catalyst. The resulting compositions were then heated at 150° C. for 16 hours, 200° C. for 16 hours, and 250° C. for 16 hours.

In Table III below there is shown the results obtained from test slabs of the various compositions containing 100 parts of copolymer, 40 parts of filler in the form of fume silica treated with octamethylcyclotetrasiloxans, and varying amounts of curing catalysts after they had been cured and heat-aged. "H" is hardness (Shore A), "T" is tensile (p.s.i.), and "E" is elongation (percent).

*Table III*

| Parts of Curing Catalyst | 150° C./16 Hrs. | | | 200° C./16 Hrs. | | | 250° C./16 Hrs. | | |
|---|---|---|---|---|---|---|---|---|---|
| | H | T | E, percent | H | T | E, percent | H | T | E, percent |
| 0.2 ZnO | 79 | 700 | 110 | 76 | 860 | 120 | 79 | 600 | 90 |
| 0.9 ZnO | 75 | 390 | 60 | 78 | 660 | 100 | 81 | 520 | 50 |
| 3.5 ZnO | 74 | 580 | 90 | 75 | 530 | 70 | 86 | 590 | 40 |
| 0.9 ZnO+2 pts.$(BzO)_2$ | 81 | 510 | 70 | 80 | 800 | 70 | 85 | 680 | 50 |
| 2 pts.$(BzO)_2$ | 71 | 430 | 70 | 81 | 510 | 40 | 81 | 720 | 20 |

EXAMPLE 4

Following the procedure of Example 1, an equilibration catalyst was formed from an equal molar mixture of water and phosphorous-oxychloride. The equilibration catalyst was slowly warmed to 45° C. and maintained at that temperature for a period of about 12 hours. The equilibration catalyst was then employed at various proportions by weight, i.e. .07%, 0.17% and 0.5% based on the weight of organopolysiloxane to equilibrate octamethylcyclotetrasiloxane. The respective mixtures were equilibrated at 45° C. for 20 hours followed by an additional 24 hours at 150° C. Equilibration was performed under an atmosphere of nitrogen and the resulting gums were then cooled and kept in capped jars.

Organopolysiloxane compositions convertible to the cured, solid, elastic state were prepared directly from the above gums without further treatment, by milling respective 100 parts of gum with 40 parts of fumed silica, varying amounts of benzoyl peroxide $(BzO)_2$, 1.8 parts of glycerol and 7.3 parts of iron oxide. The compositions were then cured for 16 hours at 250° C. and heat-aged for 16 hours at 315° C. In Table IV below there is shown the results obtained with slabs made in accordance with the aforedescribed procedure, where H, T and E are as defined above.

*Table IV*

| Weight percent of Equilibration Catalyst | Curing Catalyst, Pts./100 Gum (BzO) | 150° C./16 Hr. | | | 250° C./16 Hr. | | | 315° C./16 Hr. | | |
|---|---|---|---|---|---|---|---|---|---|---|
| | | H | T | E | H | T | E | H | T | E |
| 0.07 | 0.2 | 43 | 210 | 160 | 43 | 180 | 90 | 58 | 230 | 80 |
| | 0.4 | 55 | 1,010 | 480 | 57 | 660 | 410 | 89 | 300 | 30 |
| | 1.6 | 57 | 1,040 | 350 | 63 | 830 | 290 | 64 | 580 | 170 |
| 0.17 | 0.2 | 59 | 510 | 200 | 62 | 510 | 140 | 67 | 390 | 80 |
| | 0.4 | 56 | 120 | 70 | 59 | 410 | 230 | 60 | 390 | 190 |
| 0.5 | 0.2 | 52 | 200 | 190 | 55 | 360 | 240 | 64 | 590 | 210 |
| | 0.4 | 58 | 480 | 290 | 64 | 770 | 330 | 69 | 670 | 180 |

EXAMPLE 5

An equilibration catalyst was made by forming a mixture of water and phosphorous-oxychloride at a 2 to 1 mole ratio of phosphorous-oxychloride to water. The mixture was then heated for 4 hours at 80° C. The product was then analyzed for equivalents [Cl⁻] per gram of mixture, and equivalents of [H⁺] per gram of mixture in accordance with the previous procedure. It was found that the product contained 0.0058 equivalent of [Cl⁻], 0.0136 equivalents of [H⁺], and the Cl/P had a value of about 0.75. In addition, infrared established the presence of P—OH and P=O.

EXAMPLE 6

There is added to a mixture of 291 parts of octamethylcyclotetrasiloxane, 9 parts of hexamethyldisiloxane, 24 parts of acetone, and 1 part of an equilibration catalyst. The equilibration catalyst is formed by mixing phosphorous pentachloride and water at room temperature in a proportion of two moles of water per mole of the pentachloride. The mixture is then heated to 60° C. and maintained at 60° C. for 16 hours. The mixture is equilibrated at 82 to 84° C. for 21 hours. After the equilibration is completed, the resulting mixture is stripped of solvent, cooled, and treated with 15 parts of dry fuller's earth and filtered. There is obtained a methylpolysiloxane fluid having a viscosity of about 50 centipoises at 25° C.

The results obtained as shown in the above examples and tables clearly demonstrate the valuable utility of the equilibration catalyst of the present invention for providing an improved method for making from cyclic polydiorganosiloxanes, and various organopolysiloxane mixtures, a variety of organopolysiloxane polymers and copolymers. Those skilled in the art would know, for example that the organopolysiloxane elastomers shown in Tables II and IV could not be obtained from organopolysiloxane gums formed by using sulphuric acid as a equilibration catalyst without the latter being thoroughly washed from the polymer. The polymers made in accordance with the present invention were employed directly without any additional treatment for the production of organopolysiloxane compositions convertible to the cured, solid, elastic state. In addition, the organopolysiloxane elastomers made from the gums produced in accordance with the present invention exhibit resistance to heat-age comparable to elastomers made from polymers produced by conventional procedures. Those skilled in the art would also know, in view of the analytical results in Table I and Example 5, and the aforementioned work by J. R. Van Wazer et al., that the equilibration catalyst of the present invention is shown by Formula 5 or Formula 6.

While the foregoing examples have of necessity been limited to only a few of the very many variables within the scope of the present invention, it should be understood that the present invention covers a much broader class of organopolysiloxane polymers and copolymers composed of the units shown in Formulas 2 and 3 which can be made by the employment of an equilibration catalyst formed from the phosphorous compounds described above.

What I claim as new and desire to secure by Letters Patent of the United States is:

1. A process for making a polymer having the formula,

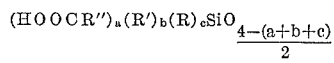

which comprises heating to a temperature between 20° C. to 170° C., a mixture comprised of organopolysiloxane, and .01% to 10% by weight thereof of an equilibration catalyst, where said organopolysiloxane is selected from the class consisting of (a) an organsiloxane hydrolyzate consisting of components having chemically combined structural units included by the formula, $(R)_d SiO_{4-d/2}$ (b) a carboxyalkyl hydrolyzate consisting of components having chemically combined structural units included by the formula,

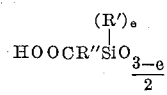

and (c), a mixture of said organosiloxane hydrolyzate and said carboxyalkyl hydrolyzate, and where said equilibration catalyst is the product of reaction at a temperature in the range of from −10° C. to 100° C., of from 0.1, to less than about 3, moles of water, per mole of a phosphorous halogen compound, selected from the class consisting of phosphorous pentachlorides and phosphorous oxygen chlorides, $a$ is equal to from 0 to 1, inclusive, $b$ is equal to from 0 to 2, inclusive, $c$ is equal to from 0 to 3, inclusive, and the sum of $a$, $b$ and $c$ is equal to from 1.5 to 3, inclusive, $d$ is an integer equal to from 1 to 3, inclusive, $e$ is an integer equal to from 1 to 2, inclusive, R is a member selected from the class consisting of monovalent hydrocarbon radicals, halogenated monovalent hydrocarbon radicals and cyanoalkyl radicals, and R' is a member selected from the class consisting of monovalent hydrocarbon radicals and halogenated monovalent hydrocarbon radicals, and R'' is an alkylene radical.

2. A process for making a polymer having the formula,

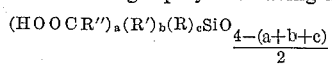

which comprises heating to a temperature between 20° C. to 170° C., a mixture comprised of organopolysiloxane, and .01% to 10% by weight thereof of an equilibration catalyst, where said organopolysiloxane is selected from the class consisting of (a) a carboxyalkyl hydrolyzate consisting of components having chemically combined structural units included by the formula,

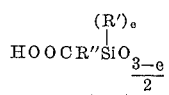

and (b) a mixture of said carboxyalkyl hydrolyzate and an organosiloxane hydrolyzate having the formula, $(R)_d SiO_{4-d/2}$ and where said equilibration catalyst is the product of reaction at a temperature in the range of from −10° C. to 100° C., of from 0.1 to less than about 3 moles of water, per mole of a phosphorous halogen compound, selected from the class consisting of phosphorous pentachlorides and phosphorous oxygen chlorides, $a$ is equal to from .001 to 1, inclusive, $b$ is equal to from 0 to 2, inclusive, $c$ is equal to from 0 to 2.5, inclusive, and the sum of $a$, $b$ and $c$ is equal to from 1.5 to 3, inclusive, $d$ is an integer equal to from 1 to 3, inclusive, $e$ is an integer equal to from 1 to 2, inclusive, R is a member selected from the class consisting of monovalent hydrocarbon radicals, halogenated monovalent hydrocarbon radicals and cyanoalkyl radicals, and R' is a member selected from monovalent hydrocarbon radicals and halogenated monovalent hydrocarbon radicals, and R'' is an alkylene radical.

3. A process for making a polymer having the formula, $(R)_c SiO_{(4-c/2)}$ which comprises heating to a temperature between 20° C. to 170° C., a mixture comprised of organopolysiloxane and .01% to 10% by weight thereof of an equilibration catalyst, where said organopolysiloxane is a mixture consisting of components having chemically combined structural units included by the formula, $(R)_d SiO_{4-d/2}$ and where said equilibration catalyst is the product of reaction at a temperature in the range of from −10° C. to 100° C., of 0.1 to less than about 3 moles of water per mole of a phosphorous halogen compound selected from the class of phosphorous pentachlorides and phosphorous oxygen chlorides, $c$ is equal to from 1.5 to 3, inclusive, $d$ is an integer equal to from 1 to 3, inclusive, and R is a member selected from the class consisting of monovalent hydrocarbon radicals, halogenated monovalent hydrocarbon radicals and cyanoalkyl radicals.

4. The method of claim 1, where the equilibration catalyst is the product of reaction of from 0.1 to less than 3 moles of water per mole of a phosphorous oxygen chloride, and water.

5. The method of claim 3, where the phosphorous-oxygen halide is phosphorous-oxychloride.

6. A process for making a polymer having the formula,

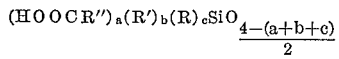

which comprises heating to a temperature between 20° C. to 170° C., a mixture comprised of organopolysiloxane and .01% to 10% by weight thereof an equilibration catalyst, where said organopolysiloxane is a member selected from the class consisting of (a) an organosiloxane hydrolyzates consisting of components having chemically combined structural units included by the formula,

(b) a carboxyalkyl hydrolyzate consisting of components having chemically combined structural units included by the formula,

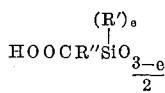

and (c), a mixture of said organosiloxane hydrolyzate and said carboxyalkyl hydrolyzate, where said equilibration catalyst is a member selected from the class consisting of phosphorous chloro acid having the formula,

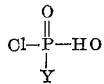

and a mixture of phosphorous halo acids having the formulae,

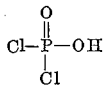

and

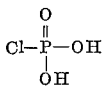

and $a$ is equal to from 0 to 1, inclusive, $b$ is equal to from 0 to 2, inclusive, $c$ is equal to from 0 to 3, inclusive, and the sum of $a$, $b$ and $c$ is equal to from 1.5 to 3, inclusive, $d$ is an integer equal to from 1 to 3, inclusive, $e$ is an integer equal to from 1 to 2, inclusive, Y is a member selected from the class consisting of chloro and hydroxy, R is a member selected from the class consisting of monovalent hydrocarbon radicals, halogenated monovalent hydrocarbon radicals and cyanoalkyl radicals, and R' is a member selected from monovalent hydrocarbon radicals and halogenated monovalent radicals, and R" is an alkylene radical.

7. A process in accordance with claim 6, where the equilibration catalyst is dichloro-ortho-phosphoric acid.

References Cited by the Examiner
UNITED STATES PATENTS

| | | |
|---|---|---|
| 2,371,068 | 3/1945 | Rochow _____ 260—448.2 XR |
| 2,472,629 | 6/1949 | Sprung. |
| 2,723,987 | 11/1955 | Speier. |
| 3,015,646 | 1/1962 | Speier. |
| 3,047,528 | 7/1962 | Bluestein. |
| 3,175,995 | 3/1965 | Elliott. |

MORRIS LIEBMAN, *Primary Examiner.*

A. KOECKERT, *Examiner.*

J. H. DERRINGTON, *Assistant Examiner.*